Jan. 19, 1960 C. E. LOMAX 2,921,982

TELEPHONE SYSTEM

Filed Dec. 13, 1955 6 Sheets-Sheet 1

INVENTOR.
CLARENCE E. LOMAX
BY McWatters Owen
ATTY.

Jan. 19, 1960 C. E. LOMAX 2,921,982

TELEPHONE SYSTEM

Filed Dec. 13, 1955 6 Sheets-Sheet 2

DIGIT ABSORBER 300

INVENTOR.

CLARENCE E. LOMAX

BY Wm Walter Owen

ATTY.

INVENTOR.
CLARENCE E. LOMAX
BY Mc Walter Owen
ATTY.

INVENTOR.
CLARENCE E. LOMAX
BY Mc Walter Owen
ATTY.

Jan. 19, 1960 C. E. LOMAX 2,921,982

TELEPHONE SYSTEM

Filed Dec. 13, 1955 6 Sheets-Sheet 5

INVENTOR.
CLARENCE E. LOMAX
BY Wm. Walter Owen
ATTY.

Jan. 19, 1960 C. E. LOMAX 2,921,982
TELEPHONE SYSTEM
Filed Dec. 13, 1955 6 Sheets-Sheet 6
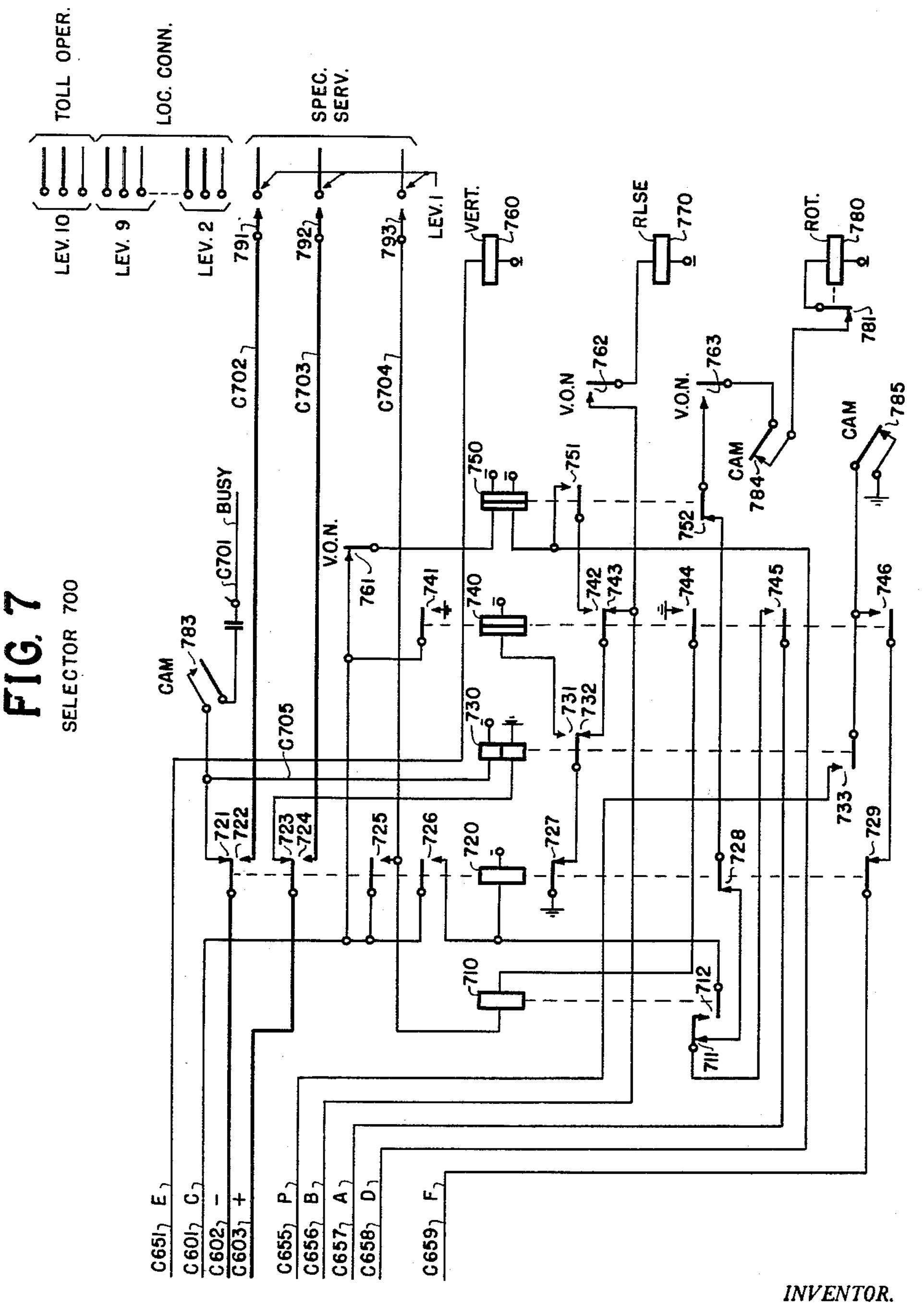
FIG. 7 SELECTOR 700
INVENTOR.
CLARENCE E. LOMAX
BY Wm. Walter Owen
ATTY.

United States Patent Office
2,921,982
Patented Jan. 19, 1960

2,921,982

DIGIT ABSORBER FOR A TELEPHONE SYSTEM

Clarence E. Lomax, Chicago, Ill., assignor to General Telephone Laboratories, Incorporated, a corporation of Delaware Application December 13, 1955, Serial No. 552,828

11 Claims. (Cl. 179—16)

The present invention relates to telephone systems in general, but is more particularly concerned with telephone systems having digit absorber facilities.

It is one object of the present invention to provide means in a digit absorber circuit to determine whether or not a dialled series of impulses, or digit, is to be absorbed or not.

It is another object of the invention to provide a digit absorber circuit interposed between a substation and a selector for determining whether or not the wipers of the selector will be rotated upon receipt of different digital impulses.

It is a further object of this invention to provide a digit absorber circuit associated with one line finder only long enough to absorb certain first two digits, and to then release the digit absorber and make it available for seizure by another line finder prior to all the digits being dialled in the first connection.

A feature of the invention is the use of one digit absorber circuit common to each of a plurality of groups of finder-selector links without calls therethrough interfering with each other.

The invention both as to its organization and method of operation, together with other objects and features thereof, will best be understood by reference to the following specification taken in connection with the accompanying drawings.

In the drawings:

Fig. 1 diagrammatically shows a plurality of exchange areas.

Fig. 2 diagrammatically shows a plurality of line finders terminating individual selectors, and showing digit absorbers each common to a different group of line finders and each connected to every fifth finder.

Figure 5:
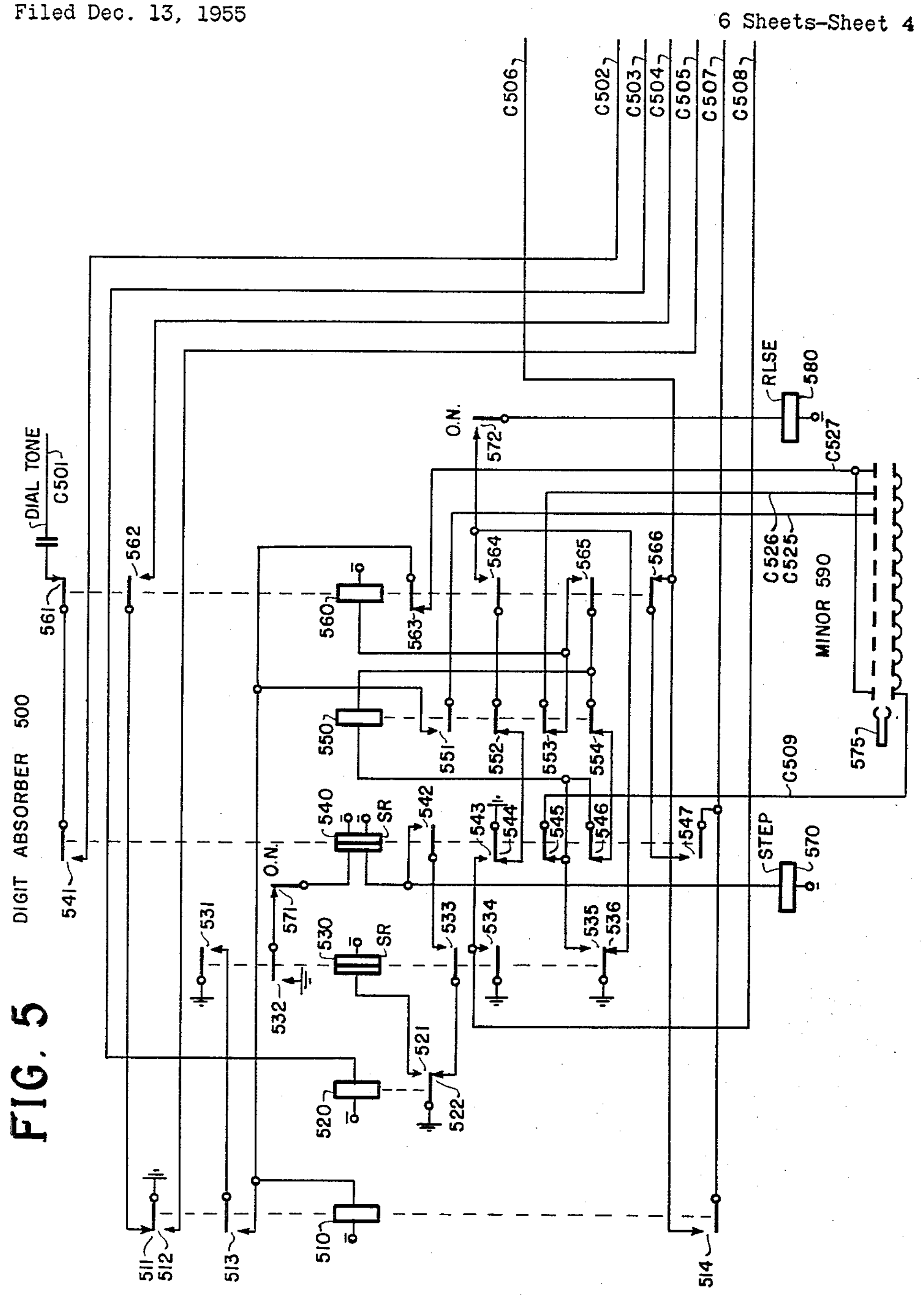
Figure 6:
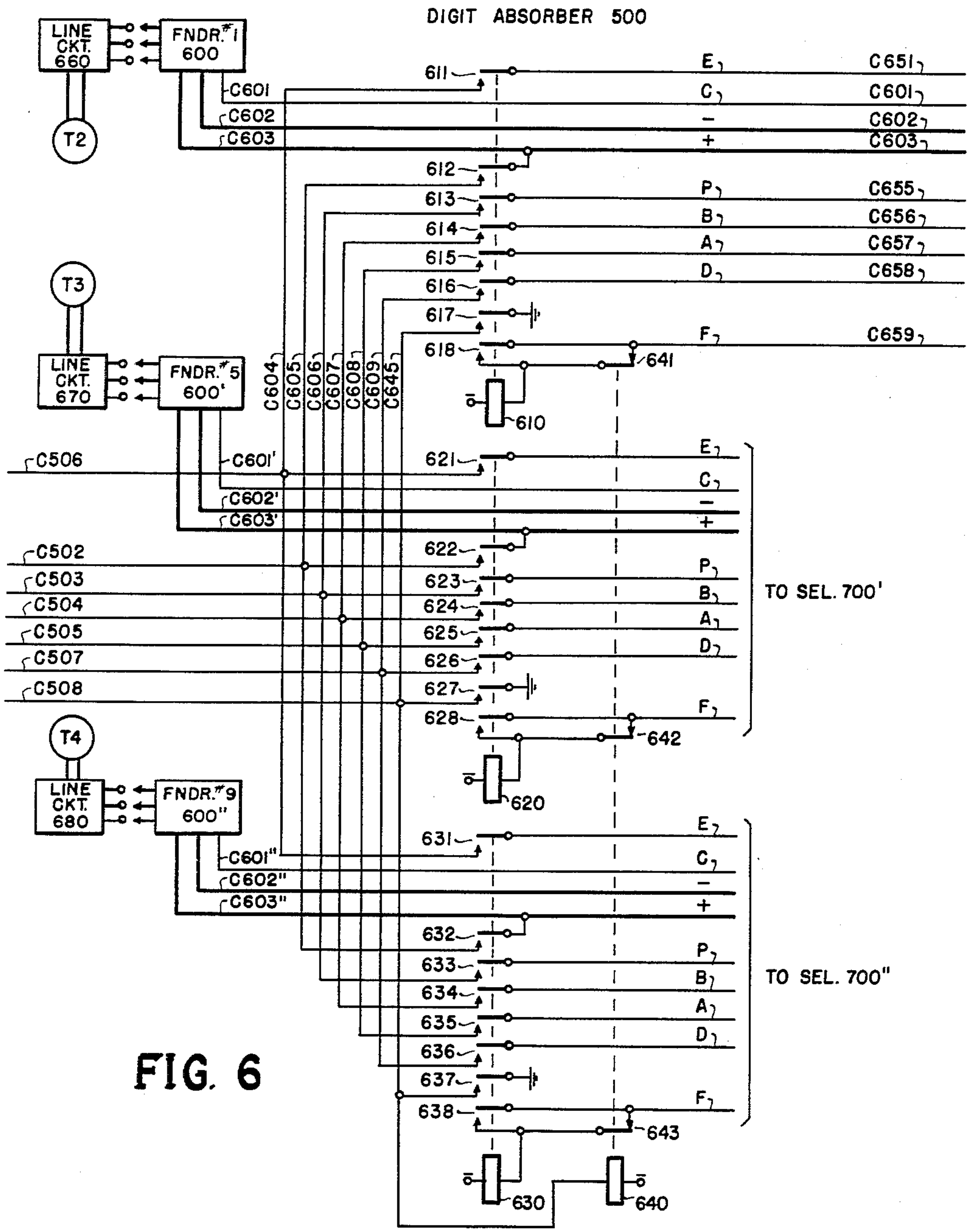

Figs. 5 and 6, with Fig. 6 placed to the right of Fig. 5, show a modified form of digit absorber circuit arranged for absorbing certain digital impulses.

Fig. 7 shows a selector circuit arranged for operating in conjunction with said last digit absorber circuit.

Figures 1, 2:
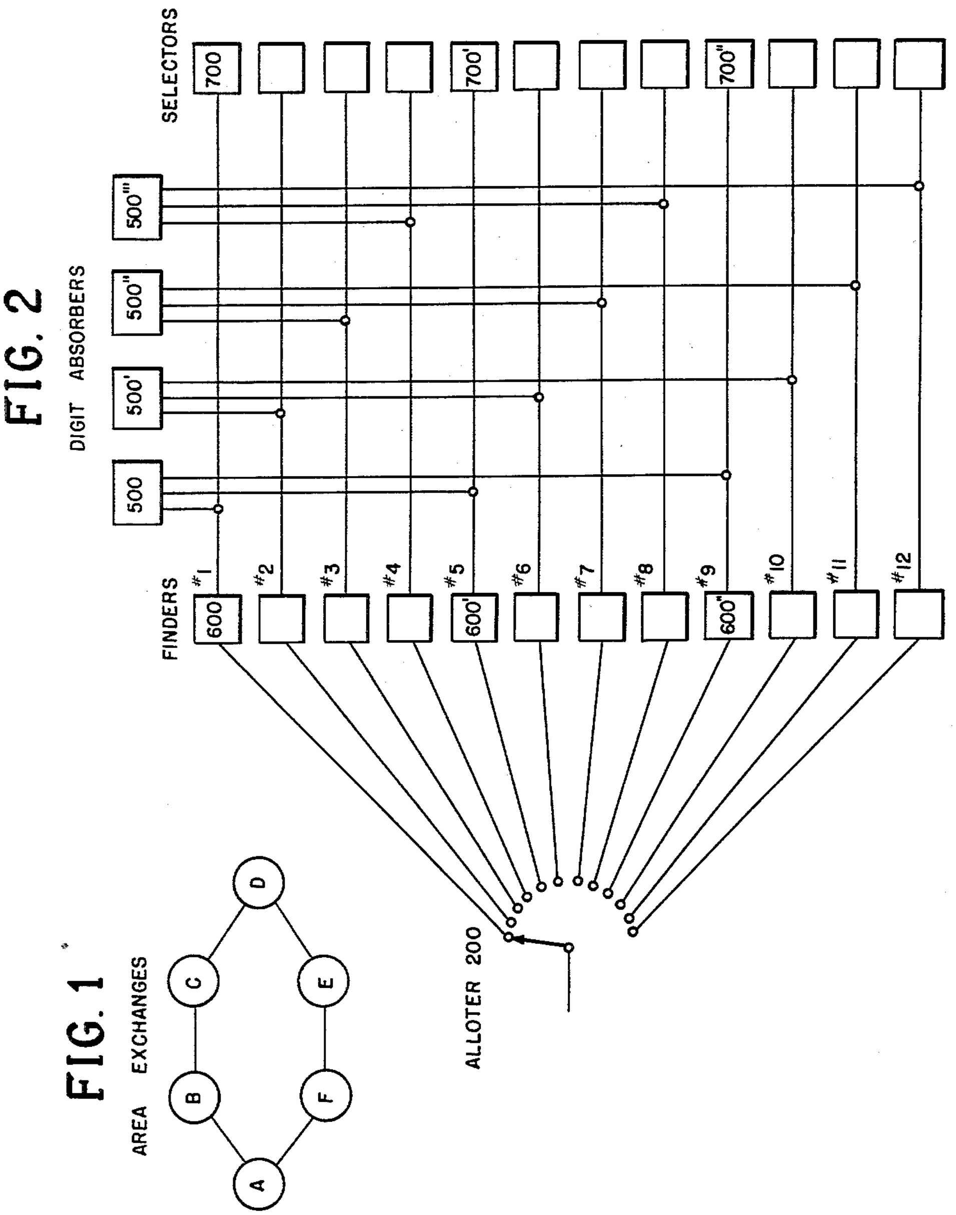

Referring now more particularly to Fig. 1, there is shown a plurality of exchange areas or zones A, B, C, D, E and F each of which may include one exchange or more. The introduction of nation-wide toll dialling is making it necessary to use seven digit call numbers in all exchanges even though the exchange is far from being large enough to require that many digits for local calls. The requirements for seven digits applies to a zone or group of several offices or exchanges. For example, a toll operator at area A dials three digits to select a distant zone D, via areas B and C and then dials seven digits to connect with a certain line. The seven digits may have to operate switches in one or more of the exchanges in the terminating zone in order to reach the required exchange. Even though only a few of the seven digits operate switches in the terminating office, the subscribers in that office must have seven digit call numbers so that the distant calling party and the toll operator do not have to translate a smaller number into a seven digit number, and the purpose of the invention is to provide means for absorbing the extra digits in a local call.

Figure 3:
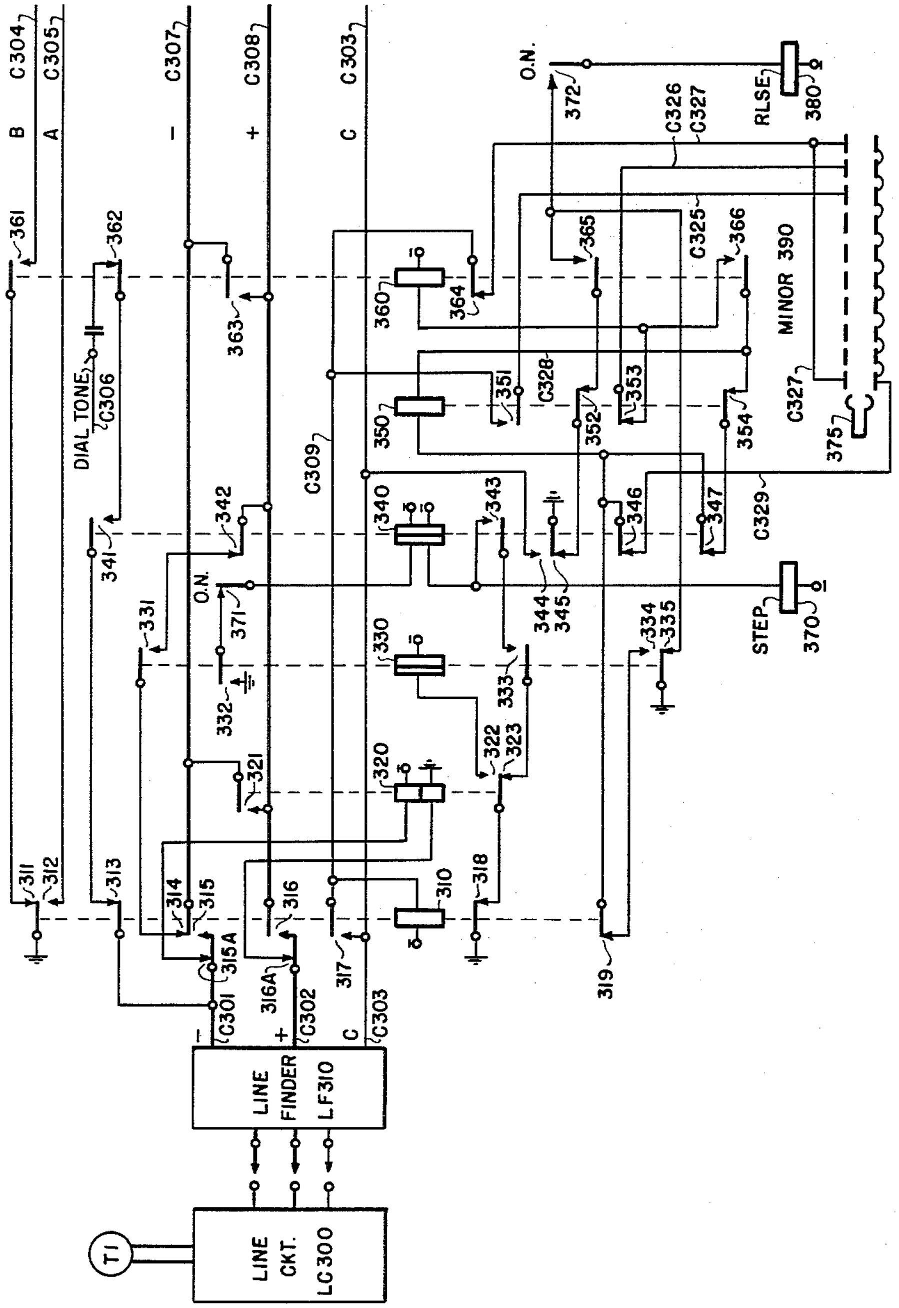
Fig. 3 shows a digit absorber circuit arranged for absorbing certain digital impulses.
Figure 4:
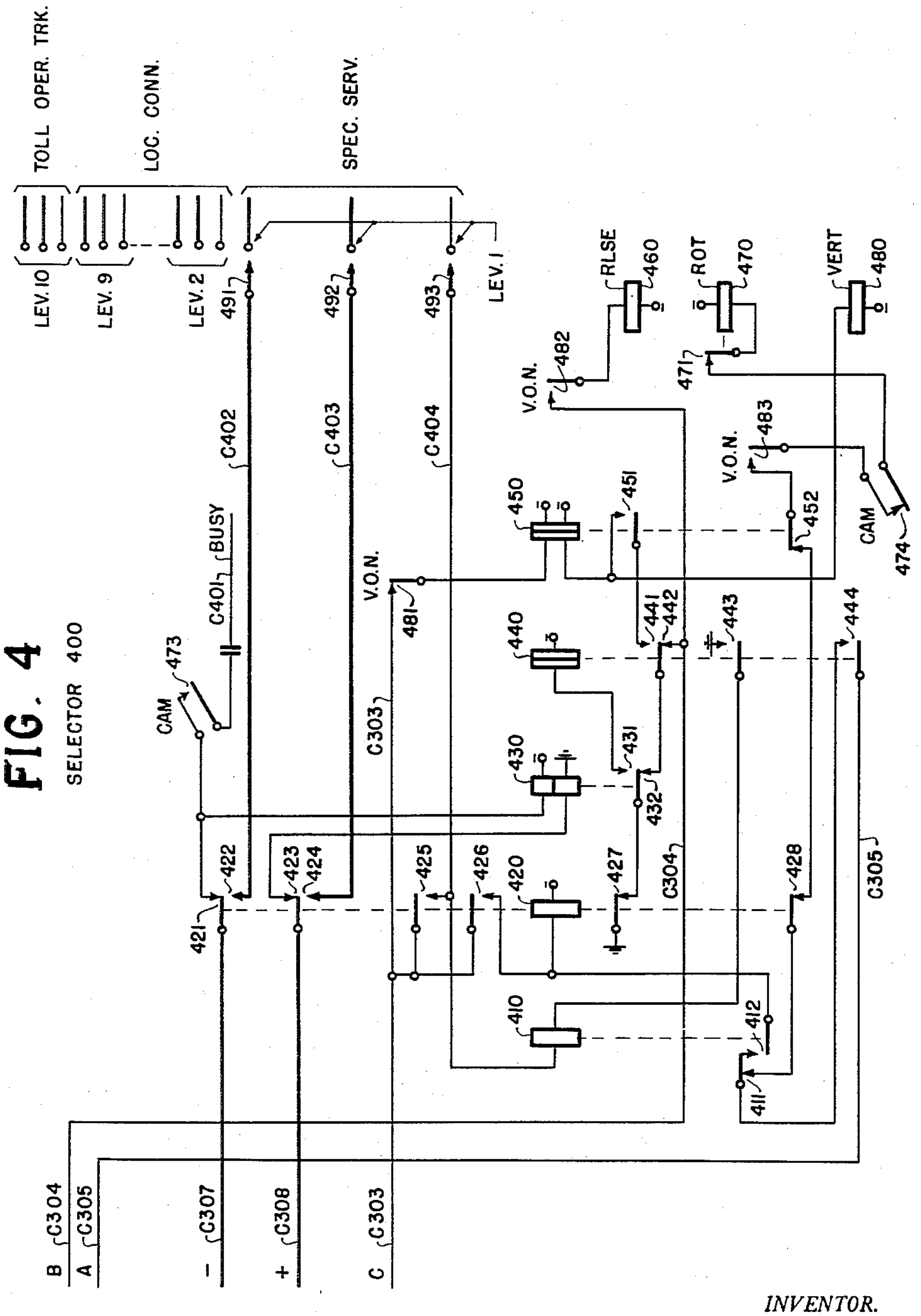
Fig. 4 shows a selector circuit arranged for operating in conjunction with said digital absorber circuit.

Referring to Figs. 3 and 4, with Fig. 4 placed to the right of Fig. 3, there is shown a digit absorber 300 (Fig. 3) connected to the link between a finder LF310 shown only in block form and the associated first selector 400 (Fig. 4). There is also shown diagrammatically in Fig. 3 a subscriber's substation T1 and an associated line circuit LC300. The mentioned equipment will all be located in area A (Fig. 1). Area A will be assumed to contain an exchange called the Wurmuth office, and for that reason in order to make local calls the letters "WU" translatable to numbers "98" must be the first two letters or digits dialled of a seven digit call number. Exchange "Wurmuth" is to be considered a small exchange not requiring more than five numbers to handle all the subscribers in the area. For that reason it will be the purpose of digit absorber 300 to absorb the first two digits "98." These two digits, although absorbed, must be dialled first before dialling the remaining five digits in order to complete the call through the selector.

The digit absorber 300 (Fig. 3) consists of six relays and a so called minor switch 390 which is a rotary switch. The minor switch 390 consists of ten contacts accessible to the wiper 375 which is stepped thereover upon receipt of dialled impulses in a conventional manner. The first contact is used for completion of special service calls upon the wiper 375 being stepped thereto. The second to seventh contacts are dead contacts having no outlet. The eighth and ninth contacts are used for local calls upon the dialling of digits "98" to be described. The tenth contact is used for toll calls to be described. Upon the subscriber at substation T1 dialling "1" as the first digit, the digit absorber 300 will not absorb the digit but repeat the digital impulse to selector 400 and complete a circuit for stepping and rotating the wipers of selector 400 to and over the first level of bank contacts for completion of a special service call. Should the substation T1 dial the digit "0" as the first digit, the digit absorber will complete a circuit for stepping and rotating the wipers of selector 400 to and over the tenth level of the bank contacts to signal the toll operator. In order to make a local call the digit "9" must first be dialled, whereby digit absorber 300 will repeat the nine impulses to selector 400 however, although the wipers of selector 400 are stepped to the ninth level there is no circuit means for rotation thereof, instead, a circuit is completed for restoring the wipers of selector 400 and the wiper 375 of minor switch 390. At the end of the series of nine impulses a shunt circuit is provided to prevent the next digit dialled, the digit "8," from being repeated to selector 400. The dialling of the digit "8" operates the wiper 375 of the minor switch 390 to the eighth contact to complete a circuit for dialling the next digit directly into selector 400, at the same time releasing and disconnecting the digit absorber from use for the remainder of the time of dialling the seven dialled digit number. Should the first digit dialled be any digit from "2–7," the wiper 375 would lock up on a dead contact. In order to release the wiper from the dead contact, the calling party would have to replace his handset. The dialling of any digit other than "8" after the digit "9" has been dialled for local calls, would also move the wiper to either a dead contact or an open circuit requiring the calling party to replace the handset to release the equipment.

Referring to Fig. 2 there are shown twelve line finders interconnecting individual selectors, such as 700. The twelve finders will handle approximately 100 lines and are assigned for use in consecutive order by an allotter 200. The allotter 200 is of the well-known type which allots finders in consecutive order. Four digit absorbers 500, 500′, 500″, 500‴ are used to handle all twelve line finders, each absorber handling every fifth finder. Digit absorber 500 will handle finders #1, #5, and #9; digit absorber 500′ will handle finders #2, #6, and #10; digit absorber 500″ will handle finders #3, #7, and #11; digit absorber 500‴ will handle finders #4, #8, and #12. In this manner no one digit absorber will be likely to be seized by two finders at the same instance. This arrangement will be an alternative used in area A (Fig. 1).

Figs. 5 and 6 show the details of the digit absorber circuit 500 disclosed in Fig. 2 assigned to the three line finders #1, #5, and #9. Fig. 7 shows the selector circuit 700 shown in box form in Fig. 2. Fig. 6 shows three substations T2, T3, and T4. Also shown are three line circuits 660, 670, and 680 all being of conventional design. The mentioned line circuits are accessible to all twelve line finders depending on the assigned consecutive order by the allotter 200 (Fig. 2). This arrangement is similar in operation to absorber 300 (Fig. 3) and selector 400 (Fig. 4) except for the common usage of one digit absorber by three line finders. Selector 700 is similar to conventional type selectors except for the addition of six conductors A, B, D, E, F, and P to be explained more fully in the ensuing description.

Upon seizure of digit absorber 500 and selector 700 (Figs. 5, 6, and 7) by a calling subscriber via line finder 600 (Fig. 6), a circuit is prepared for accepting dialled digital impulses, and at the same time a circuit is completed for temporarily preventing seizure of the digit absorber 500 by either the line finders 600′ or 600″. Should the calling subscriber dial the digit "1" for special service or the digit "0" for toll service the digit absorber 500 and the seized selector 700 would respond and complete the call. This completion of the call would allow the other line finders (600′ or 600″) to seize the digit absorber 500. This allows a finder, such as 600′, to seize digit absorber 500 and the desired digits to be dialled into its associated selector 700′. It is to be understood that the selectors 700′ and 700″ are identical to selector 700 (Fig. 7). The seizure by other finders would hold true after dialling "98" for a local call. Should any first digit from 2 to 7 be dialled, the wiper 575 of digit absorber 500 would hang up on a dead contact whereby the calling party would have to replace the handset to release the equipment. The assignment of the digit absorbers to links 1, 5, etc. as shown in Fig. 2, allows enough time for the calling subscriber who seized line finder #1 to dial the one or two digits for operating the selector 700 to the desired level and to thereby release the digit absorber before the allotter 200 would allot the fifth finder #5.

We will assume that the diagrams and circuitry shown in Figs. 2, 5, 6, and 7 represent alternative equipment located in exchange "Wurmuth" of area A (Fig. 1). The first two letters "WU" likewise represent the numerals "98" for local calls.

*Calls from area A*

Assuming that a substation T1 in area A (Fig. 3) of the Wurmuth exchange desires to make a special service call, the calling party will initially remove the handset. The closure of the line loop will operate a line circuit LC–300, which in turn, by means of an allotter (not shown), will cause a finder, such as LF–310, to search for and connect with the calling party in the manner well-known in the art. We will assume, that this finder LF–310 is linked with digit absorber 300 and selector 400 (Figs. 3 and 4) via conductors C301, C302, and C303.

A loop circuit now extends from the telephone to pulsing relay 320 of absorber 300 (Fig. 3), the circuit extending via the loop circuit on the one hand, negative conductor C301, contacts 315A, upper winding of relay 320 to battery; and on the other hand, positive conductor C302 contacts 316A, lower winding of relay 320 to ground. The operation of relay 320 completes an obvious circuit for operating relay 330 at contacts 322. A loop circuit is completed to selector 400 at contacts 321. The operation of relay 330, at contacts 332, completes an obvious circuit for operating relay 340 through its upper winding; at contacts 333, a circuit is prepared for maintaining relay 340 operated and for preparing an operating circuit for the stepping magnet 370; at contacts 334, a circuit is prepared for operating either relay 310 or 360 depending on the stepped position of the wiper 375 of the minor switch on its bank contacts. At contacts 331, a second loop circuit is prepared to selector 400, however, the operation of relay 340 opens contacts 342 to prevent its completion. At contacts 341, dial tone is sent back to the calling substation; the circuit extending from conductors C306, condenser, contacts 362, 341, 313, negative conductor C301, and back to the calling party. At contacts 343, a circuit is further prepared for maintaining relay 340 operated during dialling, and the stepping magnet 370 is further prepared for operation; at contacts 344, ground is applied on the C conductor C303 to hold the selector 400 and the preceding equipment; at contacts 346 and 347, circuits are opened to prevent false operation of relay 310 and 350 during the series of digital impulses.

As before mentioned, selector 400 was seized via ground on C conductor C303 (Figs. 3 and 4), VON contacts 481, upper winding of relay 450 to battery. The operation of relay 450, at contacts 451, prepares a locking circuit for itself and prepares the vertical magnet 480 for operation. Also as before mentioned, a loop circuit is extended to selector 400 from the digit absorber 300 to complete a circuit for operating the pulsing relay 430; the circuit extending from battery, upper winding of relay 430, contacts 421, conductor C307, contacts 321 (Fig. 3), conductor C308, contacts 423, and lower winding of relay 430 to ground. The operation of relay 430, at contacts 431, completes an obvious circuit for operating slow relay 440. The operation of relay 440, at contacts 441, prepares a further point in the circuit for maintaining relay 450 operated and for operating the stepping magnet. At contacts 442, a circuit is opened to prevent operation of the release magnet 460; at contacts 443, ground is placed on the test relay 410; and at contacts 444, a circuit is prepared for operating the rotary magnet 470.

Upon receipt of the dial tone the calling party will dial the code digit "1" as the first digit for special service calls, whereby one impulse will be sent in a well-known manner. Pulsing relay 320 temporarily releases during dialling of the one impulse and thereby temporarily opens contacts 321 and 322 and closes contacts 323. Relay 330, being slow-to-release, remains operated during the temporary opening of contacts 322. At contacts 323, a circuit is completed for pulsing the stepping magnet 370 one time; the circuit extending from ground through contacts 318, 323, 333, 343, winding of magnet 370 to battery. The stepping magnet 370 will thereby step the wiper 375 to the first bank contact. The stepping of the wiper 375 to its first contact opens the off-normal ON contacts 371, closes the off-normal ON contacts 372, and also completes a circuit for operating relay 310, the circuit extending from battery, winding of relay 310, conductor C309, contacts 364, conductor C327, first bank contact of minor switch 390, wiper 375, conductor C329, and contacts 346, 319, 334 to ground. The operation of relay 310, at contacts 312, places ground on the conductor C305; at contacts 313, dial tone is disconnected; at contacts 315 and 316, the loop circuit from the calling party is now extended directly into selector 400; at contacts 315A and 316A, the circuit is opened to restore the pulsing relay 320; at contacts 318, the circuit is opened to restore relays 330 and 340 after a short delay; at contacts 319, the circuit is opened to relay 310, however, at contacts 317, relay 310 locks itself operated via ground on the conductor C303. The restoration of relay 330, at contacts 335, completes a circuit for operating the release magnet 380, the circuit extending from ground, contacts 335, ON contacts 372, and winding of release magnet 380 to battery. The operation of release magnet 380 restores the wiper 375 to its normal position, thereby closing ON contacts 371 and opening ON contacts 372. The opening of ON contacts 372, restores the release magnet 380.

During the temporary release of relay 320 upon receipt of the digital impulse, contacts 321 opened the loop circuit to relay 430 of selector 400 (Fig. 4). Relay 430 temporarily releases, opening contacts 431 and closing contact 432 temporarily. Relay 440, being slow-to-release, remains operated during the temporary opening of contacts 431. At contacts 432, a circuit is completed for operating the vertical magnet 480, the circuit extending from ground through contacts 427, 432, 441, 451, and winding of magnet 480 to battery. The vertical magnet 480 will pulse one time to step wipers 491, 492, and 493 to its first level, and thereby open VON contacts 481 and close VON contacts 482 and 483. At the end of the digital impulse, relay 320 (Fig. 3) reoperates thereby reclosing the loop circuit to selector 400 and relay 430. Relay 430 reoperates, opening contacts 432 and due to the opening of VON contacts 481, relay 450 restores. The restoration of relay 450 which was held operated during operations of relay 430 through contacts 451 opens contacts 451 to open the circuit of the vertical magnet 480. At VON contacts 482, a circuit is prepared for operating the release magnet 460, and at VON contacts 483, a circuit is prepared for operating the rotary magnet 470.

Upon the operation of relay 310 (Fig. 3), in completing a loop circuit from the calling substation to selector 400 at contacts 312, a circuit is completed for operating the rotary magnet 470 (Fig. 4); the circuit extending from ground, contacts 312, conductor C305, contacts 444, 411, 428, 452, 483, 474, 471, and winding of rotary magnet 470 to battery. Rotary magnet 470 will intermittently open and close contacts 471 to rotate the wipers 491, 492, and 493 over the bank contacts of the first level in search of battery on the C conductor of an idle trunk (not shown).

Upon test wiper 493 finding battery on the C conductor of an idle trunk during rotation, a circuit is completed for operating relay 410, the circuit extending from the battery on the C conductor of an idle trunk, test wiper 493, conductor C404, winding of relay 410, and contacts 443 to ground. The operation of relay 410 opens contacts 411 to deenergize the rotary magnet 470. At contacts 412, a circuit is completed for operating relay 420, the circuit extending from battery, through winding of relay 420, contacts 412, 444, conductor C305, and contacts 312 (Fig. 3), to ground. The operation of relay 420, at contacts 422 and 424, completes a loop circuit from the calling substation to the seized trunk; the circuit extending from the closed loop on the one hand via conductor C301 (Fig. 3), through contacts 315, conductor C307, contacts 422, conductor C402, wiper 491; and conductor C302, contacts 316, conductor C308, contacts 424, conductor C403, and wiper 492. At contacts 421 and 423, the loop circuit to relay 430 is opened, thereby restoring relay 430, which in turn restores relay 440. At contacts 425 and 426, relay 420 provides a locking circuit for this relay extending from the grounded C conductor C303, and at the same time causes relay 410 to be short-circuited so that this relay restores; at contacts 427, ground is removed to prevent further operation of relay 440; and at contacts 428, a circuit is opened to prevent further operation of the rotary magnet 470.

The next series of digital impulses can now be dialled directly into the seized trunk for completing a series of switching operations for special service in any well-known manner.

Had no idle trunk been found during rotation of the wipers of selector 400, the wipers would have rotated to the overflow or eleventh rotary position, thereby operating the cam springs which make contacts 473 and break contacts 474. The opening of cam contacts 474 opens the self-interrupter circuit of rotary magnet 470, thereby preventing rotary stepping. The closing of cam contacts 473 completes a circuit for sending busy tone back to the calling party; the circuit extending from conductor C401, condenser, contacts 473, 421, conductor C307, contacts 315, negative conductor C301, and back to the calling party, notifying him of the busy condition.

Upon the calling party noticing the busy tone, he will replace the handset upon the cradle, thereby opening the calling loop circuit to relay 430 (Fig. 4). Relay 430 restores and after a short delay relay 440 restores, whereby, at contacts 432 and 442, a circuit is completed for operating the release magnet 460, the circuit extending from ground, through contacts 427, 432, 442, 482, and winding of release magnet 460 to battery. The operation of release magnet 460 restores the wipers 491—493 to their normal position which will open VON contacts 482 to restore the release magnet 460 and close VON contacts 481. Upon closure of VON contacts 481 selector 400 is available again for use in future calls.

Upon the calling party hanging up and breaking the loop circuit, ground has also been removed from the C conductor C303 to restore relay 310. The restoration of relay 310 opens contacts 315 and 316 to further open the loop circuit to selector 400. At contacts 315A and 316A a loop circuit is prepared for operating relay 320 on future calls.

Assuming that the calling substation T1 upon attempting to make a special service call and after having seized the digit absorber 300 and selector 400, mistakenly dialled the digit "2," or for that matter any digit from "2 to 7." The wiper 375 of the digit absorber 300 would step to the second bank contact, and the wipers 491, 492 and 493 of selector 400 would step to the second level of the bank contacts in a manner previously disclosed. Wiper 375 would be standing on a dead contact, ON contacts 371 would be open and relay 340 will restore. The restoration of relay 340 opens contacts 341 to prevent dial tone from being sent back to the calling party, and also there is no circuit for operating relay 310 to provide ground for rotating the wipers of selector 400 at contacts 312. Contacts 335 of relay 330 and contacts 365 of relay 360 are opened to prevent operation of the release magnet 380, thus the wiper 375 remains on the dead contact, and the calling party will proceed to hang up to release the equipment and re-dial the correct code digit "1" for special service. It is to be noted that should the calling party continue to dial and transmit digital impulses after the wiper 375 has been stepped to the dead contact, the stepping magnet would not respond because contacts 343 of relay 340 are open, and relay 340 cannot operate due to ON contact 371 being opened when the wiper 375 was stepped to the first contact of the minor switch 390. Also at contacts 331 and 342 a shunt is placed across conductors C307 and C308 so that selector 400 cannot respond to any additional dialled impulses.

Assuming that the substation T1 desires to make a local call, the removal of the receiver and the closure of the line loop will operate a line circuit, such as LC–300. The line circuit LC–300 in turn, by means of an allotter (not shown) will cause a finder, such as LF–310, to search for and connect with the calling party in a manner well-known in the art. We will further assume again that this finder LF–310 is linked with digit absorber 300 and selector 400 as previously described. The closure of the loop circuit will operate relays 320, 330, and 340 of digit absorber 300, and relays 430, 440 and 450 of selector 400 are operated as previously described, and dial tone is sent back to the calling party.

As previously disclosed, in order to make a local call the digits "9" and "8" must be dialed for absorption by the digit absorber 300 before dialling the remaining five digits of a seven digit telephone directory listed number. We will further assume that the subscriber's number to be called is WUrmuth 9–XXXX. The letters "WU" represent the digits "98" on a telephone dial, and the last four digits, being immaterial, are each represented by X. The area A (Fig. 1) as mentioned has an exchange named for example, the "WUrmuth Exchange." Although it is an object to absorb the first two digits "98" or "WU," in order to make a local call the proper first two digits or letters "98" or "WU" must be dialed, even though it is only the remaining five digits that complete the call. Any other first two digits or letters other than "1" or "0" will operate the digit absorber wiper to dead contacts. The main reason for these bank contacts being dead is for later expansion of the exchange for other letter or number combinations to carry the load.

The dialling of "9" (W) as the first digit, will intermittently close and open contacts 323 of relay 320 nine times, whereby the following circuit is intermittently closed to the stepping magnet 370; ground, contacts 318, 323, 333, 343, winding of magnet 370 to battery. Slow-to-release relay 330 is held operated via contacts 322, throughout the impulse series. Upon the first dialled impulse of the series, the wiper 375 will step to the first contact and the ON contacts will operate, whereby ON contacts 371 will break and ON contacts 372 will make. At ON contacts 371 a circuit is opened through the upper winding of relay 340 however, relay 340 remains operated through its lower winding via contacts 343 throughout the impulse series due to its slow-to-release characteristics. At ON contacts 372 a circuit is prepared for operating the release magnet 380. Although wiper 375 lies on the first contact after the first impulse of a series of nine, relay 310 will not operate due to the fact that relay 340 is operated throughout the impulse series and maintains contacts 346 open to prevent completion of the circuit. The stepping magnet 370 will therefore step the wiper 375 to the ninth contact upon receipt of the nine impulses. At the end of the series of impulses relay 340 releases whereby contacts 346 close a circuit for operating relay 360, the circuit extending from ground, through contacts 334, 319, 346, wiper 375, conductor C326, contacts 353, and winding of relay 360 to battery. At contacts 346 and wiper 375, relay 350 is shunted to prevent its operation. The operation of relay 360, at contacts 361, completes a circuit for operating the release magnet 460 of selector 400, the circuit extending from ground, contacts 311, 361, conductor C304, VON contacts 482 (Fig. 4), winding of release magnet 460, to battery. At contacts 362, dial tone is removed from negative conductor C301. At contacts 363, relay 430 of selector 400 is shunted to prevent relay 430 from responding to the next dialled series of digital impulses. At contacts 364, a circuit is opened to prevent operation of relay 310. At contacts 365, a circuit is completed for operating the release magnet 380 via closed contacts 345 and 352. At contacts 366, relay 360 provides a locking circuit for itself, the circuit extending from battery, winding of relay 360, contacts 366, 354, 347, 319, 334, to ground. The operation of release magnet 380 restores wiper 375 to its normal position, thereby closing ON contacts 371 and opening ON contacts 372. The closing of ON contacts 371 recloses the circuit for operating relay 340. The opening of ON contacts 372 restores the release magnet 380. The reoperation of relay 340, at contacts 346, removes the shunt from relay 350 to cause its operation in series with relay 360, the circuit extending from battery, winding of relay 360, contacts 366, conductor C328, winding of relay 350, contacts 319, 334, to ground. The operation of relay 350, at contacts 351, prepares a circuit for operating relay 310, and at contacts 352 and 353, relay 350 further removes the shunt circuit for itself.

The operation of release magnet 460, over the circuit described above, restores wipers 491, 492, and 493 to their normal position, thereby closing VON contacts 481 and opening VON contacts 482 and 483. The closing of VON contacts 481 reoperates relay 450 over the circuit previously disclosed. The opening of VON contacts 482 restores the release magnet 460. The opening of VON contacts 483 opens the rotary circuit.

Upon the second digit being dialled, digit "8," relay 320 will respond to pulse the stepping magnet 370 eight times in a manner previously disclosed. However, the intermittent opening and closing of contacts 321 will have no effect on pulsing relay 430 of selector 400 due to the shunt across conductors C307 and C308 at contacts 363. Upon the wiper 375 stepping to the eighth contact a circuit is completed for operating relay 310, the circuit extending from ground, contacts 334, 319, 346, wiper 375, the eighth contact of minor switch 390, conductor C325, contacts 351, conductor C309, winding of relay 310 to battery. The operation of relay 310, at contacts 312, prepares a circuit for operating the rotary magnet 470 of selector 400; at contacts 315 and 316, a loop circuit from the calling sub-station is extended directly into selector 400; at contacts 315A and 316A, the loop circuit is opened to restore pulsing relay 320; at contacts 318, the circuit is opened to restore relay 330; at contacts 319, the circuit is opened to restore relays 350 and 360; at contacts 317, relay 310 provides an obvious locking circuit for itself from ground on the C conductor C303. The restoration of relay 330, at contacts 335, completes a circuit for operating the release magnet 380, the circuit extending from ground, contacts 335, ON contacts 372, winding of magnet 380 to battery. The operation of release magnet 380 restores the wiper 375 to its normal position thereby opening ON contacts 372 to restore the release magnet 380.

Had the second digit dialled been any other digit than "8" the wiper 375 would have been stepped to a dead contact or an open circuit. For instance, had the digit "2" been mistakenly dialled, the stepping magnet 370 would step the wiper 375 to the second contact of the minor switch 390, opening ON contacts 371 and closing ON contacts 372. The opening of ON contacts 371 restores relay 340 at the end of the series of digital impulses. At contacts 372, a circuit is prepared for operating the release magnet, however as previously disclosed, relay 350 is operated in series with relay 360 maintaining contacts 352 open to prevent completion of the circuit for operating the release magnet 380. Therefore, the wiper 375 is hung up on the dead contact of the minor switch 390, so in order to release the wiper, the calling party must replace the hand-set to release the equipment. Should the calling party continue to dial, the digital impulses would have no effect as previously disclosed.

Upon the proper first two digits "98" being dialled, the third digit (any digit from "2" to "9") will be responded to directly by selector 400. As assumed, the third digit dialled is the digit "9" whereby relay 430 will respond, the circuit extending from battery, upper winding of relay 430, contacts 421, negative conductor C307 (Fig. 3), contacts 315, conductor C301, the loop circuit, and positive conductor C302, contacts 316, positive conductor C308, contacts 423, and through the lower winding of relay 430 to ground. The pulsing relay 430 intermittently releases during the dialling of the impulses and thereby intermittently opens and closes contacts 431 and 432. The relay 440, being slow-to-release, remains operated during intermittent openings of contacts 431. During each closing of contacts 430 a circuit is completed for pulsing the vertical magnet 480, the circuit extending from ground, contacts 427, 432, 441, 451, winding of magnet 480 to battery. Upon receipt of the first impulse of the series, vertical magnet 480 will step the wipers 491—493 to the first level, thereby operating the VON contacts. VON contacts 481 will open, breaking the circuit for operating relay 450 through its upper winding, however, relay 450 will remain operated through its lower winding throughout the series of impulses. VON contacts 482 close to prepare a circuit for operating the release magnet 460. VON contacts 483 close to prepare a circuit for operating the rotary magnet 470. The vertical magnet 480 will thereby step the wipers 491, 492, and 493 to the ninth level upon receipt of the nine impulses of a series. At the end of the series of impulses relay 450 restores. The restoration of relay 450, at contacts 451, opens the circuit to deenergize the vertical magnet. At contacts 452, a circuit is completed for operating the rotary magnet, the circuit extending from battery, winding of magnet 470, contacts 471, 474, 483, 452, 428, 411, 444, conductor C305 (Fig. 3), contacts 312, to ground. Due to its self-interrupter contacts 471, the rotary magnet 470 will thereby rotate the wipers 491, 492, and 493 over the ninth level in search of an idle connector containing battery on its C conductor.

When a connector (not shown) is found idle, battery will be received therefrom over test wiper 493, in a well-known manner, to operate relay 410; the circuit extending from the battery connection to the C conductor, of the idle connector (not shown) wiper 493, conductor C404, winding of relay 410, contacts 443 to ground. The operation of relay 410, at contacts 411, further opens the rotary magnet circuit, and at contacts 412, completes a circuit for operating relay 420; the last-mentioned circuit extending from battery, winding of relay 420, contacts 412, 444, conductor C305 (Fig. 3), and contacts 312 to ground. The operation of relay 420, at contacts 426, provides a locking circuit for the relay extending to ground on C conductor C303, and at the same time causes relay 410 to be short-circuited so that this relay restores; at contacts 421, 423, permits relay 430 to release; at contacts 422, 424, extends the loop to the seized connector; at contacts 425, the C conductor C303 is now connected to conductor C404 and to the C conductor of the seized connector (not shown) so that ground returned over this conductor upon seizure of the connector in the well-known manner causes an alternative locking circuit to be completed for relay 420. The seized connector will then receive the next series of impulses. The further extension of the connection in exchange A may take place in accordance with conventional principles and, therefore, requires no detailed explanation.

Had no idle connector been found during rotation of the wipers of selector 400, the wipers would have rotated to the overflow or eleventh rotary position and return busy tone in a manner previously disclosed with regards to level one. The calling party will replace the handset on the cradle, thereby opening the loop circuit and releasing the equipment in a manner previously disclosed.

Assuming that the substation T1 desired to make a toll call to a subscriber in an exchange of area C (Fig. 1). We will again assume that line circuit LC–300 has been seized by the line finder LF–310 completing a loop circuit to the digit absorber 300, which in turn, completes a loop circuit to selector 400. In the present case toll calls are made by dialling "0" to reach a toll operator in area A. Upon completing the loop circuit, relays 320, 330 and 340 of digit absorber 300 and relays 430, 440 and 450 of selector 400 are operated as previously described.

Upon the calling party dialling "0" as the only digit the stepping magnet 370 will step the wiper 375 to the tenth contact of the minor switch, and the vertical magnet 480 of selector 400 will step the wipers 491—493 to its tenth level. At the end of the series of digital impulses relay 340 releases whereby at contacts 346 a circuit is completed for operating relay 310, the circuit extending from ground, contacts 334, 319, 346, wiper 375, conductor C327, contacts 364, conductor C309, winding of relay 310 to battery. The operation of relay 310 will release the equipment in the digit absorber 300 and complete a direct loop circuit from the calling party to selector 400 in a manner previously disclosed. At contacts 312 a circuit is completed for energizing the rotary magnet 470 to rotate the wipers 491, 492, and 493 over the tenth level in search of an idle toll trunk (not shown) containing battery on its C conductor. Assuming that an idle trunk circuit, not shown, is found, the battery on its C conductor will operate relay 410, the circuit extending from battery on this conductor via wiper 493, conductor C404, winding of relay 410, and contacts 443 to ground. The operation of relay 410, at contacts 411, opens the rotary magnet circuit to prevent further rotary motion, and at contact 412 completes a circuit for operating relay 420. The last-mentioned circuit may be traced from battery, winding of relay 420, contacts 412, 444, conductor C305 (Fig. 3) and contacts 312 to ground. The operation of relay 420, at contacts 422 and 424, extends the loop from line finder LF–310 by way of conductors C307, C308, C402, C403 and wipers 491 and 492 to the line conductors, not shown, of the toll trunk circuit. At contacts 426, relay 420 locks to ground on the C conductor C303, and short-circuits relay 410 to initiate the release of this relay, and at contacts 425, the conductor C303 is connected to conductor C404 and then to the C conductor, not shown, of the toll trunk circuit via wiper 493. Incident to the seizure of the toll trunk circuit, ground is returned over the C conductor thereat whereby, at contacts 425, a circuit is completed for holding relay 420 and the relays in the preceding equipment operated. At contacts 421 and 423, the circuit of relay 430 is opened, permitting this relay to release, and with contacts 427 and 431 open, relay 440 also restores. The toll trunk circuit will then extend the connection to an operator at a switchboard (not shown).

The toll operator upon being notified by the calling party at substation T1 that a call to area or zone D (Fig. 1) is desired will first dial three digits to operate switching equipment in area exchanges B and C to connect with a certain line in the area D in any well-known manner. The operator will then proceed to dial the seven digits pertaining to the assigned number of the party to be called in any conventional manner.

As previously disclosed in Figs. 2, 5, 6, and 7 disclose a modification which can be used in place of the digit absorber and selector of Figs. 3 and 4. This arrangement uses a digit absorber accessible in common to three line finders. A detailed description will now be given.

*Calls from area A—alternative*

Assuming that a substation, such as T2 (Fig. 6), desires to make a special service call, the calling party will initially remove the handset. The resulting closure of the line loop will operate the line circuit 660 which in turn, by means of an allotter 200 (Fig. 2), will cause a finder, such as finder 600, to search for and connect with the calling party in the manner well-known in the art. As previously mentioned, the allotter will seize a finder in a set numerical order possibly starting with finder #1 (Fig. 6), finder #2, etc., and downward to finder #12 (Fig. 2) handling 100 subscribers. We will assume that finder 600 (Fig. 6) is the first finder; that finder 600′ is the fifth finder; and finder 600″ is the ninth finder.

Finder 600 is linked with digit absorber 500 and selector 700 and selector 700 is seized via the C conductor of finder 600, the circuit extending from ground on the C conductor C601, VON contacts 761 (Fig. 7), and winding of relay 750 to battery. The closed line loop now is completed for operating the pulsing relay 730 of selector 700, the circuit extending on the one hand via the closed loop, negative conductor C602 (Fig. 6), contacts 721 (Fig. 7), conductor C705, upper winding of relay 730 to battery, and positive conductor C603 (Fig. 6), contacts 723, and lower winding of relay 730 to ground. The operation of relay 730, at contacts 731, completes an obvious circuit for operating relay 740. At contacts 733, ground is placed on the P conductor C655 via cam contacts 785. The operation of relay 740, at contacts 741, grounds the C conductor C601 to hold the preceding equipment; at contacts 742, a circuit is partly prepared for pulsing the vertical magnet 760; at contacts 744, ground is placed on the relay 710 of selector 700; at contacts 745, a circuit is partially prepared for operating the rotary magnet. At contacts 746, a circuit is completed for operating relay 610 (Fig. 6), the circuit extending from battery, winding of relay 610, contacts 641, conductor C659, and contacts 729, 746, 785, to ground. The operation of relay 610, at contacts 611 and 616, further prepares a circuit for operating the vertical magnet 760; at contacts 615, a circuit is prepared for operating rotary magnet 780; at contacts 614, a circuit is prepared for operating the release magnet 770; at contacts 618, relay 610 maintains an alternative path for its operation. At contacts 617, a circuit is completed for operating relay 640, the circuit extending from ground, contacts 617, conductor C645, and winding of relay 640 to battery. At contacts 613, a circuit is completed for operating relay 520 of digit absorber 500 (Fig. 5), the circuit extending from battery, winding of relay 520, conductors C503, C606, contacts 613, P conductor C655, contacts 733, 785, to ground. The operation of relay 520, at contacts 521, completes an obvious circuit for operating relay 530. The operation of relay 530, at contacts 532, completes an obvious circuit for operating relay 540 through its upper winding; at contacts 533, a circuit is prepared for operating the stepping magnet 570; at contacts 534, a circuit is completed via conductors C508 and C645 for ensuring the operation of relay 640. The operation of relay 640, via the alternate circuits mentioned, opens contacts 641, 642, and 643. The opening of contacts 641 opens the original circuit for operating relay 610 however, relay 610 remains operated over its own locking contacts 618. The operation of relay 540, at contacts 541, completes a circuit for sending dial tone back to the calling party; the circuit extending from conductor C501 (Fig. 5), condenser, contacts 561, 541, conductors C502, C605, contacts 612, positive conductor C603, and back to the calling substation T2 via finder 600 and line circuit 660. At contacts 542, a circuit is prepared for operating the stepping magnet 570, at contacts 543, another ground is placed on conductor C508 to maintain relay 640 operated, and at contacts 547, a circuit is prepared for pulsing the vertical magnet 760 (Fig. 7) of selector 700.

Upon receipt of the dial tone the calling party will dial the digit "1" for a special service call thereby temporarily deenergizing the pulsing relay 730 of selector 700. Contacts 731 will temporarily open, however relay 740, being slow-to-release, remains operated. At contacts 733, a circuit is temporarily opened to release relay 520 of digit absorber 500. At contacts 732, a circuit is completed for operating the vertical magnet 760, the circuit extending from battery, winding of magnet 760, E conductor C651, contacts 611, conductors C604, C506, contacts 566, 547, conductors C507, C609, contacts 616, D conductor C658, contacts 751, 742, 732, 727, to ground. Upon the receipt of the impulse, the vertical magnet 760 will move the wipers 791, 792, and 793 up one step and operate the VON contacts, whereby contacts 761 will break and contacts 762 and 763 will make. The breaking of VON contacts 761 and the opening of contacts 732, at the end of the single digital impulse, will restore relay 750. At VON contacts 762, a circuit is prepared for operating the release magnet 770. The restoration of relay 750, at contacts 752, and the closure of VON contacts 763, prepares a circuit for operating the rotary magnet 780.

The temporary restoration of relay 520 (Fig. 5) during the dialling of the digital impulse, due to the opening of contacts 733, opens contacts 521 temporarily, however, relay 530 being slow-to-release remains operated. At contacts 522, a circuit is completed for operating the stepping magnet 570, the circuit extending from ground, contacts 502, 533, 542, winding of magnet 570, to battery. Upon receipt of the one impulse the magnet 570 will step the wiper 575 to the first contact of the minor switch 590 and operate the ON contacts, whereby contacts 571 open and contacts 572 close. The reoperation of relay 520, at the end of the digital impulse, and the opening of ON contacts 571 restores relay 540. At ON contacts 572, a circuit is prepared for the release magnet 580. The restoration of relay 540, at contacts 545, completes a circuit for operating relay 510, the circuit extending from battery, winding of relay 510, contacts 563, conductor C527, wiper 575 in first position, conductor C509, contacts 545, 535, to ground. The operation of relay 510, at contacts 513, completes a locking circuit for this relay, the circuit extending from ground, contacts 531, 513, winding of relay 510 to battery. At contacts 512, a circuit is completed for operating the rotary magnet 780 of selector 700, the circuit extending from ground, contacts 512, conductor C505 (Fig. 6), C608, contacts 615, A conductor C657 (Figs. 6–7), contacts 745 (Fig. 7), 711, 728, 752, 763, 784, 781, winding of magnet 780 to battery.

Due to its self-interrupting contacts 781 the rotary magnet 780 will rotate its wipers 791, 792, and 793 over the first level of bank contacts. The test wiper 793, connected to ground through relay 710, will rotate in search of battery on the C conductor of an idle connector. When an idle connector, not shown, is found, battery will be received therefrom in the well-known manner over wiper 793 to operate relay 710, the circuit extending from the battery connection, wiper 793, conductor C704, winding of relay 710, contacts 744 to ground. The operation of relay 710, at contacts 711, opens the rotary circuit, and at contacts 712 a circuit is completed for operating relay 720. The last-mentioned circuit extends from battery, winding of relay 720, contacts 712, 745; A conductor C657 (Fig. 6), contacts 615, conductors C608, C505 (Fig. 5), contacts 512 to battery. The operation of relay 720, at contacts 726, provides a locking circuit for this relay via the grounded C conductor C601. At contacts 725, relay 710 is shunted to cause its release, and the C conductor C601 is connected to the C conductor of the seized connector via wiper 793 and conductor C704; at contacts 722 and 724, the loop circuit is extended directly into the seized connector; at contacts 721 and 723, the loop circuit to relay 730 is opened to cause this relay to release; at contacts 727, the circuit is opened to restore relay 740, and at contacts 729, the circuit is opened to restore relay 610.

The completion of the loop circuit through the selector and via the finder is now accomplished and the release of relay 610 will now release the digit absorber for allowing seizure thereof by another finder, such as finder #5, even though there is an existing call via finder #1. The release of relay 610 during cutover by selector 700, at contacts 613, opens the circuit to deenergize relay 520. The deenergization of relay 520, at contacts 521, opens the circuit to restore relay 530. The restoration of relay 530, at contacts 534, and the restoration of relay 610, at contacts 617, opens the alternate circuits to release relay 640. At contacts 536, a circuit is completed for energizing the release magnet 580, the circuit extending from ground through contacts 536, ON contacts 572, and winding of magnet 580 to battery. The release magnet 580 will thereby restore the wiper 575 to its normal position, thereby closing ON contacts 571 and opening ON contacts 572 to deenergize the release magnet 580. The opening of contacts 531 and the restoration of wiper 575 opens alternate circuits to relay 510. The restoration of relay 640 closes contacts 641, 642 and 643 to allow the digit absorber 500 to be seized by another finder, such as #5 or #9 in a manner described.

The next series of digits, if required, can now be dialled directly into the seized connector in any well-known manner.

Had no idle connector been found during rotation of the wipers, the wipers 791, 792, and 793 would rotate to the over flow or off-normal position to operate the cam springs whereby cam contacts 783 would make and contacts 784 and 785 would break. The closing of cam contacts 783 completes a circuit for returning busy tone to the calling party via conductor C701 over an obvious circuit, notifying the calling party of a busy condition. At cam contacts 784, a circuit is opened to deenergize the rotary magnet 780. At contacts 785, the circuit is opened to restore relay 520, which in turn restores relay 530. The restoration of relay 530, at contacts 536, completes a circuit for energizing the release magnet 580, the circuit extending from ground, contacts 536, ON contacts 572, winding of magnet 580 to battery. The release magnet 580 wil thereby restore wiper 575 to its normal position, thereby opening ON contacts 571 and closing ON contacts 572. The opening of ON contacts 572 deenergizes the release magnet 580. The opening of cam contacts 785 also opens the circuit to restore relay 610. The restoration of relay 610, at contacts 617, opens the circuit to relay 640. The release of relay 640 closes contacts 641, 642, and 643. It is to be pointed out, that the digit absorber is now completely released even though the calling party has not yet replaced the handset upon notification of a busy signal. This permits immediate seizure of digit absorber 500 by another finder-selector combination, such as 600′ and 700′ respectively, to prevent delay of calls during heavy traffic.

The calling party at substation T2 upon receiving the busy tone will thereby replace the handset to break the loop circuit. The opening of the loop circuit restores relay 730, which in turn, releases relay 740. The release of relays 730 and 740, at contacts 732 and 743, respectively complete an obvious circuit for operating the release magnet 770. The operation of release magnet 770 restores the wipers 791—793 to their normal position, thereby closing VON contacts 761 and opening VON contacts 762 and 763. The opening of VON contacts 762 opens the circuit to restore the release magnet 770 and the closing of VON contacts 761 prepares selector 700 for future seizure.

Assume that the calling substation T2, upon attempting to make a special service call, and after having seized the digit absorber 500 and selector 700, mistakenly dialled the digit "2," or for that matter, any digit from "2" to "7." The wipers 791, 792, and 793 of selector 700 would step to the second level of the bank contacts upon receipt of two impulses, and wiper 575 of digit absorber 500 would step to the second contact in a manner similarly described. Wiper 575 would be resting on a dead contact and upon initial movement, opens ON contacts 571 to restore the relay 540. The wiper 575 being on the dead contact, there will be no circuit for operating relay 510 which provided ground for rotating the wipers of selector 700, therefore the wipers of selector 700 cannot rotate. Contacts 536 of relay 530 and contacts 564 of relay 560 are opened to prevent operation of the release magnet 580, thus the wiper 575 remains on the dead contact. Thus the calling party will have to hang up the receiver, to release the equipment and re-dial the correct digit. Should the calling party continue to dial and transmit digital impulses after the wiper 575 was stepped to a dead contact, the stepping magnet 570 would not respond due to the ON contacts 571 preventing the operating of relay 540 which controls contacts 542 and the stepping magnet. Also, the opening of contacts 547 of relay 540 and the opening of contacts 514 of relay 510, opens the circuit to the vertical magnet 760 which prevents it from further respondence. After the calling party has released the equipment, the party may proceed to re-dial the correct digit "1."

Assuming that the substation T2 desires to make a local call, the removal of the receiver and the closure of the line loop will operate line circuit 660. The line circuit 660 in turn, by means of an allotter 200 will cause a finder, such as finder 600, to search for and connect with the calling party in a well-known manner. Finder 600 is linked with digit absorber 500 and selector 700 as previously disclosed. The loop circuit will operate relays 730, 740, and 750 of selector 700, and providing digit absorber 500 is idle, relays 520, 530, and 540 will operate in a manner described, whereby dial tone is sent back to the calling party.

As previously disclosed, in order to make a local call the digits "9" and "8" representing the first two letters "WU" of the Wurmuth exchange number must first be dialled for absorption by the digit absorber 500 before dialling the remaining five digits of a seven digit directory listed number. We will further assume that the subscriber's number to be called is WUrmuth 5–XXXX. The letters "WU" representing the digits "98" on a telephone dial, and the last four digits being immaterial, are each represented by X. As before mentioned, any other first two digits or letters other than "1" or "0" will operate the digit absorber wiper to dead contacts.

The dialling of "9" (W) as the first digit will intermittently close and open contacts 733 of relay 730 nine times, whereby the following circuit is intermittently closed to the stepping magnet 760; ground, conacts 727, 732, 742, 751, D conductor C658, contacts 616, conductors C609, C507, contacts 547, 566, conductors C506, C604, contacts 611, E conductor C651, winding of vertical magnet 760 to battery. Contacts 733 intermittently open and close the circuit to relay 520 over a previously traced circuit. The vertical magnet 760 will step the wipers 791, 792, and 793 to the ninth level, and VON springs operate upon the first step. VON contacts 761 break to open the circuit to relay 750 through its upper winding, and at the end of the series of impulses relay 750 releases. VON contacts 762 and 763 close to prepare circuits to the release and rotary magnets 770 and 780 respectively.

Upon receipt of the nine impulses relay 520 (Fig. 5) will intermittently open and close contacts 522 nine times. Relay 530, being slow-to-release, remains operated during the intermittent openings of contacts 521. A circuit is now completed for pulsing the stepping magnet 570, the circuit extending from ground, contacts 522, 533, 542, and winding of stepping magnet 570 to battery. The stepping magnet, upon receipt of the first impulse of a series, steps the wiper 575 to the first contact of its bank, after operating the ON springs. At ON contacts 571, a circuit is opened to relay 540 through its upper winding, relay 540 however remains operated throughout the impulse series via its lower winding. The wiper 575 engaging the first contact during stepping will have no effect on relay 510 since contact 545 of relay 540 is open. The stepping magnet 570 will proceed to step the wiper to the ninth contact. At the end of the impulse series relay 540 restores, removing dial tone upon opening contacts 541. At contacts 542 the circuit is opened to the stepping magnet 570; at contacts 544, a circuit is prepared for operating the release magnet 580; at contacts 547, the circuit is opened to the vertical magnet 760 of selector 700. At contacts 545, a circuit is completed for operating relay 560, the circuit extending from ground, contacts 535, 545, wiper 575, the ninth contact of minor switch 590, conductor C526, contacts 553, and winding of relay 560 to battery. The operation of relay 560, at contacts 561, further removes dial tone from the calling subscriber and at contacts 563, a circuit is opened to prevent operation of relay 510. At contacts 565, a locking circuit is completed for this relay, the circuit extending from ground, contacts 535, 546, 554, 565, and winding of relay 560 to battery. At contacts 562, a circuit is completed for restoring the wipers of selector 700, the circuit extending from ground, contacts 511, 562, conductors C504, C607, contacts 614 (Fig. 6), B conductor C656, VON contacts 762 (Fig. 7), winding of release magnet 770 to battery. At contacts 564, a circuit is completed for restoring the wiper 575 of absorber 500, the circuit extending from ground, contacts 544, 552, 564, ON contacts 572, and winding of release magnet 580 to battery. At contacts 566, another point is opened in the circuit of verical magnet 760. The release magnet 580 will restore the wiper 575 to its normal position thereby opening ON contacts 572 to restore the release magnet 580, and at ON contacts 571, a circuit is closed to reoperate relay 540 and prepare the digit absorber 500 for the next series of digital impulses.

Upon reoperation of relay 540 the shunt is removed at contacts 545 to cause relay 550 to operate in series with relay 560; the circuit extending from battery, winding of relay 560, contacts 565, winding of relay 550, contacts 535 to ground. The operation of relay 550, at contacts 551, prepares a circuit to relay 510; at contacts 552, a circuit is opened to the release magnet 580, at contacts 553, the original circuit for operating relay 560 is opened, relay 560 however remaining operated over the above mentioned series circuit, and at contacts 554, relay 550 further opens its own shunt circuit.

The operation of release magnet 770 of selector 700 restores the wipers 791—793 to their normal position releasing the VON springs in the process. VON contacts 761 close to reoperate relay 750 over an obvious circuit, and VON contacts 762 open to restore the release magnet 770. The operation of relay 750, at contacts 752, opens a point in the circuit to the rotary magnet 780, and also VON contacts 763 are open to prevent completion thereof. Selector 700 and digit absorber 500 are now set for the next series of digital impulses.

The calling party will now proceed to dial the second letter "U," translated to the digit "8" on a telephone dial. Upon receipt of the eight impulses relay 730 intermittently opens and closes contacts 732 in the circuit of the vertical magnet 760, however, the operation of relay 560 of digit absorber 500 has opened the circuit at contacts 566 to prevent operation of the vertical magnet 760. The wipers of selector 700 will therefore remain in their normal positions throughout the impulse series. At contacts 733, an intermittent circuit is opened and closed to pulsing relay 520 of absorber 500 over the mentioned path. Upon receipt of the first impulse of a series of eight the stepping magnet 570 will operate the wiper 575 to the first contact of the minor switch 590 and operate the ON springs, whereby contacts 571 open and 572 close. The stepping magnet 570 will operate wiper 575 to the eighth contact upon receipt of the eight impulses. At the end of the series of impulses relay 540 releases to complete a circuit at contacts 548 for operating relay 510, the circuit extending from ground, contacts 535, 545, conductor C509, wiper 575, the eighth contact of minor switch 590, conductor C525, contacts 551, winding of relay 510 to battery. The operation of relay 510, at contacts 512, prepares a circuit for rotary magnet 780 of selector 700. At contacts 513, relay 510 completes a locking circuit for itself via contacts 531. At contacts 514, a circuit is prepared for the vertical magnet 760 of selector 700. Due to contacts 536 and 552 being open the release magnet 580 will not operate to release the wiper 575 from the eighth contact. Due to the restoration of relay 540 and the opening of contacts 542 the stepping magnet will not respond to the next dialled digit.

The calling party at substation T2 will now proceed to dial the third digit, the digit "5." Upon receipt of the five digital impulses relay 730 intermittently opens and closes contacts 732 to pulse the vertical magnet 770, the circuit extending from battery, winding of vertical magnet 760, E conductor C651, contacts 611 (Fig. 6), conductors C604, C506 (Fig. 5), contacts 514, conductors C507, C609, contacts 616, D conductor C658, contacts 751, 742, 732, 727, to ground. At contacts 733, an intermittent circuit is completed for pulsing relay 520, having no effect however on the stepping magnet 570 due to contacts 542 being open. Upon receipt of the first impulse of a series, the vertical magnet 760 will step the wipers 791, 792, and 793 to the first level of the bank contacts, thereby operating the VON springs. The operation of the VON springs opens contacts 761 and closes contacts 762 and 763. The opening of VON contacts 761 opens the circuit for operating relay 750 through its upper winding, relay 750 however remains operated via its lower winding throughout the impulse series. At VON contacts 762, a circuit is prepared to the release magnet 770, and at VON contacts 763 a circuit is prepared to the rotary magnet 780. The vertical magnet 760 will thereby operate the wipers 791—793 to the fifth level upon receipt of the five digital impulses of a series.

At the end of the series of digital impulses relay 750 restores and, at contacts 751, completes a circuit to the rotary magnet 780, the circuit extending from battery, winding of magnet 780, contacts 781, 784, 763, 752, 728, 711, 745, A conductor C657, contacts 615, conductors C608, C505, contacts 512 to ground. Rotary magnet 780 will intermittently open and close contacts 781 to rotate the wipers 791, 792, and 793 over the bank contacts of the fifth level in search of battery on the C conductor of an idle connector circuit (not shown).

Upon test wiper 793 finding battery on the C conductor of an idle connector during rotation, a circuit is completed for operating relay 710; the circuit extending from battery on the C conductor of an idle connector, test wiper 793, conductor C704, winding of relay 710, and contacts 744 to ground. The operation of relay 710 opens contacts 711 to deenergize the rotary magnet 780. At contacts 712, a circuit is completed for operating relay 720, extending from battery, winding of relay 720, contacts 712, 745, A conductor C657 (Fig. 6), contacts 615, conductors C608, C505 (Fig. 5), and contacts 512 to ground. The operation of relay 720, at contacts 722 and 724, completes a loop circuit from the calling substation to the seized connector, extending from the closed loop on the one hand via negative conductor C602 (Fig. 6), contacts 722 (Fig. 7), conductor C702, wiper 791, and on the other hand, positive conductor C603 (Fig. 6), contacts 724 (Fig. 7), conductor C703, wiper 792 to the seized connector. At contacts 721 and 723, the loop circuit to relay 730 is opened to cause the relay to restore; at contacts 727, the circuit is opened to restore relay 740. At contacts 725 and 726, relay 720 provides a locking circuit for itself extending from the grounded C conductor C704, and at the same time causes relay 710 to be shortcircuited so that this relay restores; at contacts 728, a further point is opened to the rotary magnet, and at contacts 729 the circuit is opened to restore relay 610.

The restoration of relay 610 opens all its contacts; at contacts 613, the circuit is opened to restore relay 520; at contacts 617, one of the grounds is removed to relay 640. The restoration of relay 520, at contacts 521, opens the circuit to relay 530 to cause this relay to release. The restoration of relay 530, at contacts 531, opens the circuit to restore relay 510; at contacts 534, the alternate circuit to relay 640 is opened to cause this relay to release; at contacts 535, the series circuit is opened to restore relays 550, and 560. At contacts 536, a circuit is completed to operate the release magnet, the circuit extending from ground, contacts 536, ON contacts 572, winding of magnet 580 to battery. The operation of the release magnet 580 will restore the wiper 575 to its normal position closing ON contacts 571 and opening ON contacts 572 in the process. The opening of ON contacts 572 restores the release magnet 580, and at ON contacts 571 a circuit is prepared to relay 540.

The restoration of relay 640 opens contacts 641, 642 and 643 for preparing the digit absorber 500 for seizure by either line finder 600′ and 600″ even though the calling party at substation T2 has not completed the remaining digits of a seven digit call number. The calling party at substation T2 may now proceed to dial the next digit directly into the seized connector, etc.

Had no connector been found idle during rotation of the wipers of selector 700 the wipers would have rotated to the overflow or eleventh rotary position, thereby operating the cam springs which close contacts 783 and open contacts 784 and 785. The closing of cam contacts 783 would return busy tone over a path previously traced; cam contacts 784 open the rotary circuit to restore magnet 780; and cam contacts 785 open the circuit to restore relay 610. The restoration of relay 610 would restore the digit absorber 500 in a manner previously disclosed and prepare it for future seizure. The calling party will, upon noticing the busy tone, replace the receiver to release selector 700 in a manner previously disclosed, and will also release the finder 600 in a well-known manner.

In order for the party at substation T2 to make a toll call, the digit "0" must be dialled. It will be pointed out, with reference to Fig. 5, that the first and tenth contacts of the minor switch 590 are multipled to conductor C527, thereby the digit absorber 500 will operate in the same manner for completing the loop circuit to the selector 700 upon receipt of either one or ten impulses, the only difference being the location of the wiper 575 after the series of digital impulses. The selector on the other hand would naturally step to the tenth level upon receipt of ten impulses in contrast to the first level upon receipt of one impulse. Therefore the detail explanation for operating the digit absorber 500 and selector 700 upon receipt of ten impulses is not considered necessary. However, assuming that the selector 700 has stepped to the tenth level and the wipers 791—793 have found an idle operator's trunk, the operator thereat will converse with the calling party over an obvious circuit. We will further assume that the calling party desired to call a party in area D (Fig. 1); the operator will dial three digits to operate switching equipment possibly in exchanges F and E (Fig. 1) to connect with a certain line in the zone D in any well-known manner. The operator will then proceed to dial the seven digits pertaining to the assigned number of the party to be called in any conventional manner.

During heavy traffic it is very probable that a good many line finders may be in use and extended conversation may be taking place. For instance, the allotter 200 (Fig. 2) may allot line finder #5 (Fig. 2) to substation T3 (Fig. 6) upon the party at this substation removing his handset, and almost immediately thereafter a party at substation T2 (Fig. 6) removes his handset to make a call. We will assume that other substations (not shown) have seized line finders #6, #7, #8, #9, #10, #11, and #12 (Fig. 2) and conversation is taking place thereover to still other substations (not shown). Under these circumstances the allotter 200 (Fig. 2) would by-pass the busy line finders #6, #7, #8, #9, #10, #11, and #12 and assuming line finder #1 is idle, it would be seized. We will further assume that substation T3 is making a local call which as previously disclosed requires first the dialling of the digits "98" (WU). Under this condition, relays 620 and 640 (Fig. 6) would be operated by its associated selector 700′ during the dialling of the digits "98" in an identical manner disclosed with respect to selector 700. As it is the usual practice of calling parties to wait for dial tone, which the party at substation T2 would not receive from the digit absorber 500, due to the fact that contacts 641 are open and prevent the operation of relay 610, he will proceed to wait. Dial tone as previously disclosed is sent back to substation T2 from digit absorber 500 via contacts 612 which is open. However, a loop circuit does exist to the selector 700 from substation T2; the circuit extending from the closed loop, negative conductor C602, contacts 721, upper winding of relay 730 to battery, and from the closed loop, positive conductor C603, contacts 723, lower windings of relay 730 to ground. The operation of relay 730 at contacts 731 completes an obvious circuit for operating relay 740. The operation of relay 740, at contacts 741, places ground on the C conductor C601 to hold the preceding equipment.

With the mentioned preceding equipment held, the calling party at substation T2 will proceed to wait for dial tone. After the calling party at substation T3 has dialled the first two digits "98" of a seven digit number for a local call, the digit absorber 500 will be released in a manner previously disclosed. Dial tone will thus be sent back to substation T2 upon the operation of relay 610 closing contacts 612. The party at substation T2 may then proceed to dial the desired numbers to operate equipment in the manner previously disclosed.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is set forth in the appended claims:

What is claimed is:

1. In a telephone system, a numerical switch of the trunk-hunting type having wipers and levels of bank contacts, relay means in said switch responsive to digital impulses for operating said wipers in one direction, a digit absorber comprising a separate piece of apparatus connected with said switch over a plurality of conductors, means in said digit absorber also responsive to said digital impulses for registering said impulses, a first circuit including at least one of said conductors extending from said digit absorber to said numerical switch for controlling the operation of said wipers of said numerical switch in a second direction, a second circuit extending from said digit absorber to said numerical switch for restoring said wipers of said numerical switch to a normal position, and means in said digit absorber for completing said first or second circuit dependent upon the digit registered therein.

2. In a telephone system, a numerical switch of the trunk-hunting type having wipers and levels of bank contacts, a digit absorber circuit comprising a separate piece of apparatus apart from said switch having a rotary switch including a wiper and a plurality of bank contacts, relay means in said numerical switch responsive to digital impulses for operating said wipers in a first direction, relay means in said digit absorber circuit responsive to the same digital impulses as said relay means of said numerical switch for rotating said wiper to a certain bank contact, a first circuit including at least one conductor extending from said digit absorber to said numerical switch for controlling the operation of said wipers of said numerical switch in a second direction, a second circuit including at least one conductor extending from said digit absorber to said numerical switch for restoring said wipers of said numerical switch to a normal position, and means in said digit absorber for controlling said first or second circuit depending on the bank contact engaged by said wiper of said rotary switch for determining whether the wipers of said numerical switch will be advanced in said second direction over the bank contacts or restored to normal position.

3. In a telephone system, numerical switches each having a wiper and groups of bank contacts accessible thereto, means in each switch operated responsive to received impulses corresponding to digits of a called number for operating its wipers in a first direction to select a group of contacts, a digit absorber common to a plurality of said switches by means of a plurality of connectible conductors, means responsive to the seizure of one of said switches for temporarily connecting said conductors between said digit absorber and said one switch, means in the digit absorber also operated responsive to said received impulses for registering certain of the digits received by said switch, a first circuit including at least one of said conductors extending from said digit absorber to said numerical switch for controlling the operation of said wipers of said numerical switch in a second direction, a second circuit including at least another of said conductors extending from said digit absorber to said numerical switch for restoring said wipers of said numerical switch to a normal position, and means in the digit absorber for completing said second circuit to release the operated switch or for completing said first circuit to permit its continued operation, dependent upon the digit registered therein.

4. A telephone system such as claimed in claim 3 in which the digit absorber is released for seizure by another numerical switch as soon as a certain number of digits have been registered therein.

5. In a telephone system, a line finder, a numerical switch of the trunk-hunting type having wipers and levels of bank contacts, a digit absorber circuit interposed between said line finder and said numerical switch, a first loop circuit including a first pair of conductors extending from said line finder to said digit absorber circuit, a normally open second loop circuit, means in said digit absorber responsive to completion of said first loop circuit for completing said second loop circuit from said digit absorber circuit to said numerical switch, other circuits interconnecting said digit absorber and said numerical switch, relay means in said digit absorber circuit for registering digital impulses received via said first loop circuit and for repeating said digital impulses to the numerical switch over said second loop circuit, relay means in said numerical switch responsive to said digital impulses over said second loop circuit for operating the wipers thereof to a predetermined level of contacts, means in said digit absorber circuit depending on the number of impulses registered in said digit absorber circuit for selectively controlling said other circuits to control the rotation of said wipers or restoring the wipers to a normal position from said digit absorber circuit.

6. In a telephone system, a numerical switch of the trunk-hunting type having wipers and levels of bank contacts, a digit absorber circuit comprising a separate piece of apparatus associated with said switch over a plurality of connectible conductors, a rotary switch in said digit absorber circuit including a wiper and a plurality of bank contacts, impulse responsive means in said digit absorber circuit and impulse responsive means in said numerical switch, said first impulse responsive means operated upon receipt of digital impulses for operating the wiper of said rotary switch to the bank contact corresponding to the amount of digital impulses received while simultaneously completing a loop circuit including a pair of said conductors to said second impulse responsive means and for repeating impulses thereover for operating the wipers of said numerical switch to the levels of the bank contacts corresponding to the number of digital impulses, relay means responsive to the wiper of the rotary switch engaging a certain contact of said rotary switch to release the wipers of said rotary switch and the wipers of said numerical switch over at least one of said conductors, shunting means thereafter operated to hold said numerical switch and prevent said second impulse responsive means from responding to a second series of digital impulses, means in said digit absorber circuit operated at the end of a certain second series of digital impulses for disconnecting said digit absorber circuit from said numerical switch and said plurality of conductors for releasing said shunting means.

7. In a telephone system, a line finder, a numerical switch of the trunk-hunting type having wipers and levels of bank contacts, a digit absorber circuit interposed between said line finder and said numerical switch, a first loop circuit including a first pair of conductors extending from said line finder to said digit absorber circuit, means in said digit absorber responsive to completion of said first loop circuit for completing a second loop circuit including a second pair of conductors from said digit absorber circuit to said numerical switch, other circuits interconnecting said digit absorber circuit and said numerical switch, a rotary switch in said digit absorber circuit including a wiper and a plurality of bank contacts, relay means in said digit absorber circuit responsive to digital impulses over said first loop circuit for rotating said wiper of said rotary switch to a predetermined contact and for repeating digital impulses to the numerical switch over said second loop circuit, relay means in said numerical switch responsive to said digital impulses over said second loop circuit for operating the wipers thereof to a predetermined level of contacts, means depending on the contact engaged by said wiper of said rotary switch for determining over said other circuits whether the wipers of said numerical switch will be rotated over the contacts of the predetermined level or released to normal.

8. In a telephone system, a numerical switch of the trunk-hunting type having wipers and levels of bank contacts, a digit absorber circuit comprising a separate piece of apparatus associated with said switch over a plurality of connectible conductors, a rotary switch in said digit absorber circuit including a wiper and a plurality of bank contacts, impulse responsive means in said digit absorber circuit and impulse responsive means in said numerical switch, said first impulse responsive means operated upon receipt of digital impulses for operating the wiper of said digit absorber to the bank contact corresponding to the number of digital impulses received while simultaneously completing a loop circuit including a pair of said conductors to said second impulse responsive means and for repeating impulses thereover for operating the wipers of said numerical switch in a first direction to the levels of the bank contacts corresponding to the number of digital impulses repeated, relay means responsive to the wiper of the rotary switch engaging a certain contact on said rotary switch contact banks to release the wipers of said rotary switch and the wipers of said numerical switch over at least one of said plurality of conductors, shunting means thereafter operated at said digit absorber circuit to prevent said second impulse responsive means of said numerical switch from responding to a second series of digital impulses, means in said digit absorber circuit operated at the end of a certain second series of digital impulses for disconnecting said digit absorber circuit and said plurality of conductors for causing said numerical switch to be directly responsive to a third series of digital impulses independent of said digit absorber circuit.

9. In a telephone system, a plurality of line finders, one numerical switch of a group of switches having wipers and bank contacts accessible thereto, a loop circuit extending from one of said line finders to said numerical switch upon seizure thereof, relay means in said switch responsive to digital impulses for operating said wipers to a certain level, a digit absorber comprising a separate piece of apparatus seizable by and common to said group of numerical switches including a plurality of conductors interconnected therebetween, means in said digit absorber also responsive to said digital impulses for registering said impulses and for controlling the rotation of said wipers of said numerical switch over at least one of said conductors to or restoring the wipers to a normal position over at least another of said conductors dependent upon the digit registered therein, and means operated upon rotation thereof for disconnecting said plurality of conductors to release said digit absorber circuit without opening said loop circuit between said finder and said numerical switch for allowing seizure of said digit absorber by another numerical switch and line finder.

10. In a telephone system, a plurality of line finders, a numerical switch associated with each line finder, means for sequentially allotting said line finders in a numerical order, said finders divided into a plurality of groups, each group including finders spaced apart in said order of allotting, a digit absorber individual to each group, wipers in said numerical switch having levels of bank contacts accessible thereto, impulse responsive means in said numerical switch and impulse responsive means in said digit absorber, means in said numerical switch operated upon seizure thereof by an associated line finder for seizing said digit absorber, means in said digit absorber operated upon seizure thereof for preventing access thereto by said other associated line finders, said impulse responsive means in said numerical switch operating responsive to received digital impulses for stepping the wipers to a predetermined level of bank contacts, said impulse responsive means in said digit absorber operated responsive to the operation of said first impulse responsive means, means depending on the digital impulses received by said second impulse responsive means for controlling the rotation of said wipers, and means operated upon rotation of said numerical switch for releasing said digit absorber for allowing seizure thereof by another allotter and associated line finder.

11. In a telephone system, a plurality of line finders, a numerical switch associated with each line finder, means for sequentially allotting said line finders in a numerical order, a digit absorber circuit individual to each of a plurality of groups of said line finders, wipers in said numerical switch having levels of bank contacts accessible thereto, a rotary switch in said digit absorber circuit including a wiper and a plurality of bank contacts, impulse responsive means in said numerical switch and impulse responsive means in said digit absorber, means in said numerical switch operated upon seizure thereof by an associated line finder for seizing said digit absorber, means in said digit absorber operated upon seizure thereof preventing access thereto by said other associated line finders, said impulse responsive means in said numerical switch operating responsive to received digital impulses for stepping the wipers to a predetermined level of bank contacts, said impulse responsive means in said digit absorber operated responsive to the operation of said first impulse responsive means to step the wiper of the rotary switch to engage a predetermined bank contact, means depending on the contact engaged by the wiper of said rotary switch for controlling the rotation of the wipers of said numerical switch, and means operated upon rotation of said numerical switch for releasing said digit absorber for allowing seizure thereof by another allotter and associated line finder.

References Cited in the file of this patent

UNITED STATES PATENTS

| | | |
|---|---|---|
| 1,934,737 | Richardson | Nov. 14, 1933 |
| 2,377,314 | Christian et al. | June 5, 1945 |
| 2,642,498 | Riddell et al. | June 16, 1953 |
| 2,665,338 | Lomax | Jan. 5, 1954 |
| 2,691,066 | Fisher | Oct. 5, 1954 |
| 2,695,335 | Jones | Nov. 23, 1954 |